Patented June 18, 1935

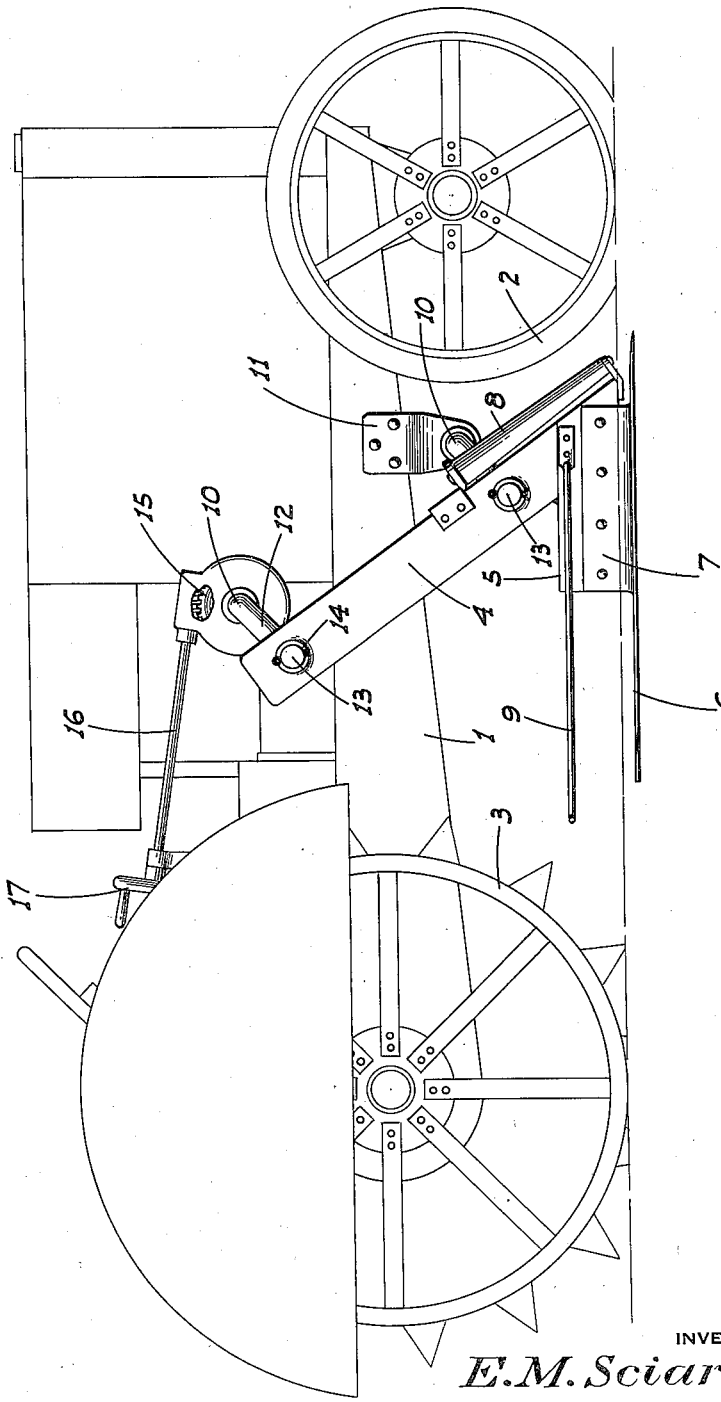

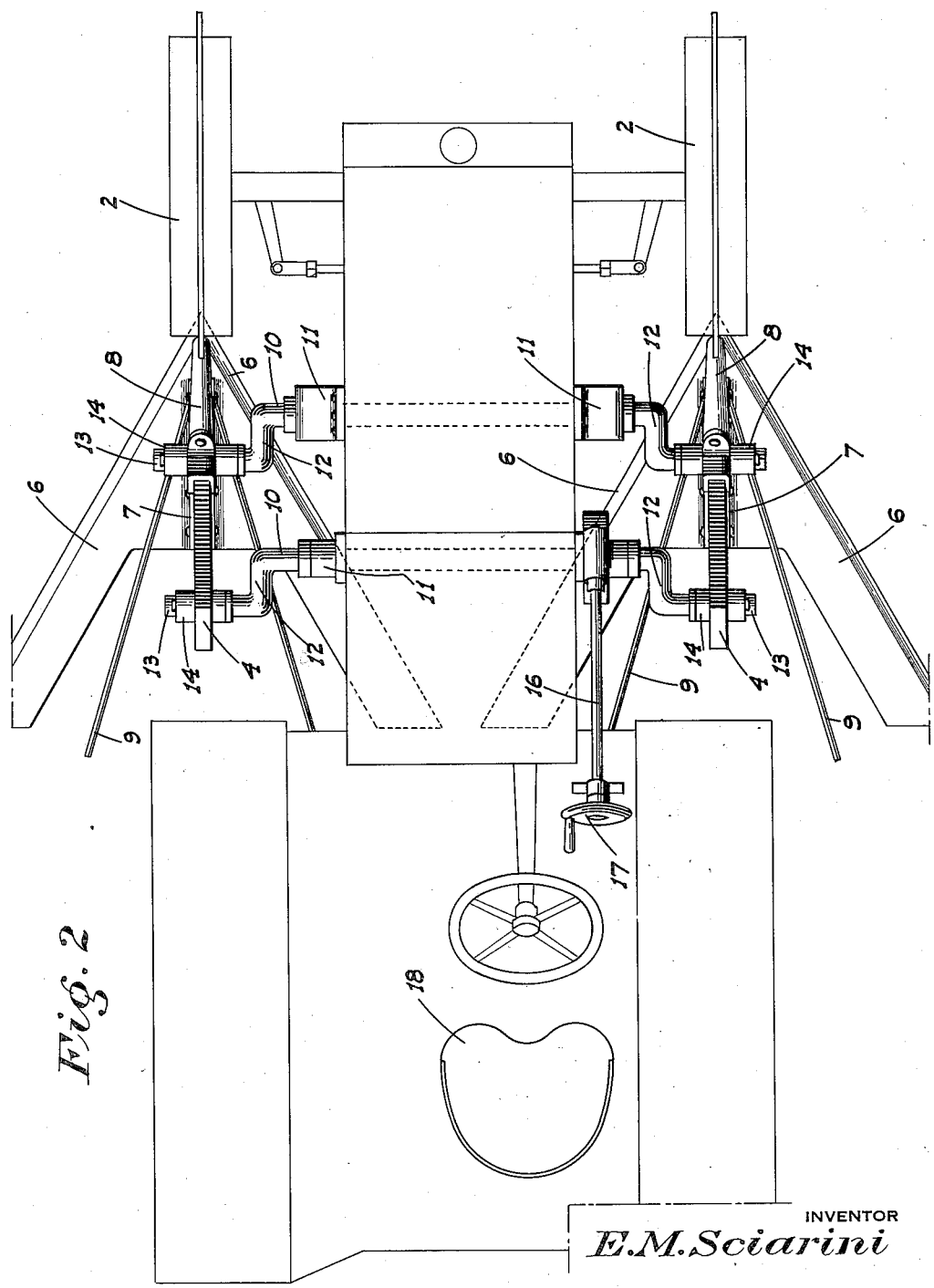

2,005,440

UNITED STATES PATENT OFFICE 2,005,440

BEAN CUTTER

Edmund M. Sciarini, Modesto, Calif.

Application April 9, 1934, Serial No. 719,719

3 Claims. (Cl. 97—47)

This invention relates to bean cutters of the frame diverging blade type, and particularly to a bean cutter of this character adapted to be mounted on a wheeled farm tractor, in which the front wheels are spaced to correspond with the standard spacing of crop rows.

The principal object of my invention is to provide a cutter particularly designed for use in relatively hard ground, arranged to be mounted on a tractor of the above type in such a manner that the converging points of the bars or cutting blades will be disposed immediately behind and in transverse central alinement with the front wheels. In this manner the blades closely follow any changes in the level of the front wheels due to ground undulations, and will not unduly dig into the ground and impart a lifting tendency to the rear drive wheels of the tractor and which causes them to lose traction. Also this positioning of the blades keeps the vines from being crushed by the relatively wide rear wheels, since they are cut and deflected to the sides of the said wheels before the latter pass over the vines.

A further object is to mount the cutter on the tractor so that the blades may be easily adjusted up and down while maintaining them horizontal at all times, and so that no structural changes or alterations of any character need be made to the tractor.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side outline of a tractor showing my improved bean cutter mounted thereon.

Figure 2 is a top plan view of the same.

Referring now more particularly to the characters of reference on the drawings, the tractor to which the cutter is applied comprises a frame 1 supported at its front end by front steerable wheels 2 and at its rear end by the drive wheels 3.

The bean cutter as a whole comprises a pair of separate cutting units disposed on opposite sides of the frame 1. Each unit comprises a rigid standard 4 having a forward slope towards its lower end and provided at the bottom with a rearwardly projecting plate 5 set on edge. Cutting blades 6 of standard character and disposed in forwardly converging relation to each other are provided with vertical flanges 7 toward the front which engage and are secured against the opposite sides of the plate 5.

The blades come together at a point a short distance ahead of the lower end of the standard, in transverse central alinement with the corresponding front wheel 2, as shown in Figure 2, and as close behind the same as is practicable, as shown in Figure 1. A taper roller 8 extends down and is mounted on the front of the standard to aid in separating and deflecting the tangled vines; while diverging rods 9 are secured on and project rearwardly from the plate 5 a certain distance above the blades to deflect the vines as they are cut clear of the path of the corresponding rear wheel.

The standards of both cutting units are supported in common from the frame 1 of the tractor by vertically spaced shafts 10 disposed in front of the standards and journaled in suitably disposed brackets 11 secured to the frame 1. The shafts are both the same distance in front of the standards and have cranks 12 on their ends of equal length and disposed parallel relative to each other. The outwardly projecting crank pins 13 of the cranks turnably engage sleeves 14 secured in and extending transversely of the standards; the spacing between the sleeves being the same as the vertical spacing between the shafts.

It will therefore be seen that if either shaft is rotated the standards will be raised or lowered and the blades supported thereby will be likewise moved vertically while remaining parallel to the ground.

Such movement is selectively imparted to one shaft, preferably the upper one by suitable means operated by the driver of the tractor. In the present instance such means is shown as constituting a worm gearing 15 mounted in connection with said upper shaft on one side, the worm of this gearing having a rearwardly projecting shaft 16 connected to an operating handle 17 positioned within convenient reach of the driver of the tractor from his seat 18. This mechanism as will be evident provides an easily controlled means to accurately adjust both cutting units simultaneously and insures the same remaining in any position to which they may be set.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A bean cutter including, with a supporting vehicle having a frame, a standard disposed to one side of the frame, a cutter mounted on the lower end of the standard, vertically spaced transverse crankshafts journaled on the frame and disposed in a plane parallel to the standard, control means for imparting rotation to one shaft, relatively long crank pins on the shafts, and sleeves fixed in the standard and turnably engaging the crank pins for substantially their full length.

2. A bean cutter including, with a supporting vehicle having a frame, a standard disposed to one side of the frame and set with a forward slant to its lower end, a cutter mounted on the lower end of the standard, crank pins turnably mounted in the standard adjacent its upper ends, crank arms rigid with and projecting forwardly from the pins on the inner side of the stadard and disposed substantially at right angles to the forward edge of the standard when the latter is in working position, transverse shafts rigid with the crank arms at their forward end and journaled on the frame, and control means applied to one shaft to rotate the same.

3. A beam cutter attachment for a tractor having horizontal side frames comprising a pair of shafts adapted to extend transversely of the tractor intermediate the ends of the frames and to be journaled thereon one above and one below the frames, crank pins on the outer ends of the shafts, outwardly of the frames, standards in which said pins are turnably mounted, cutter blades mounted on and projecting rearwardly from the lower end of the standards, and means applied to the upper shaft to rotate the same.

EDMUND M. SCIARINI.